July 20, 1954     J. W. LEIGHTON     2,684,253

VEHICLE WHEEL MOUNTING WITH CAMBER ADJUSTMENT

Filed Aug. 24, 1951     3 Sheets-Sheet 1

INVENTOR.
John W. Leighton
BY
Harness, Dickey & Pierce
ATTORNEYS

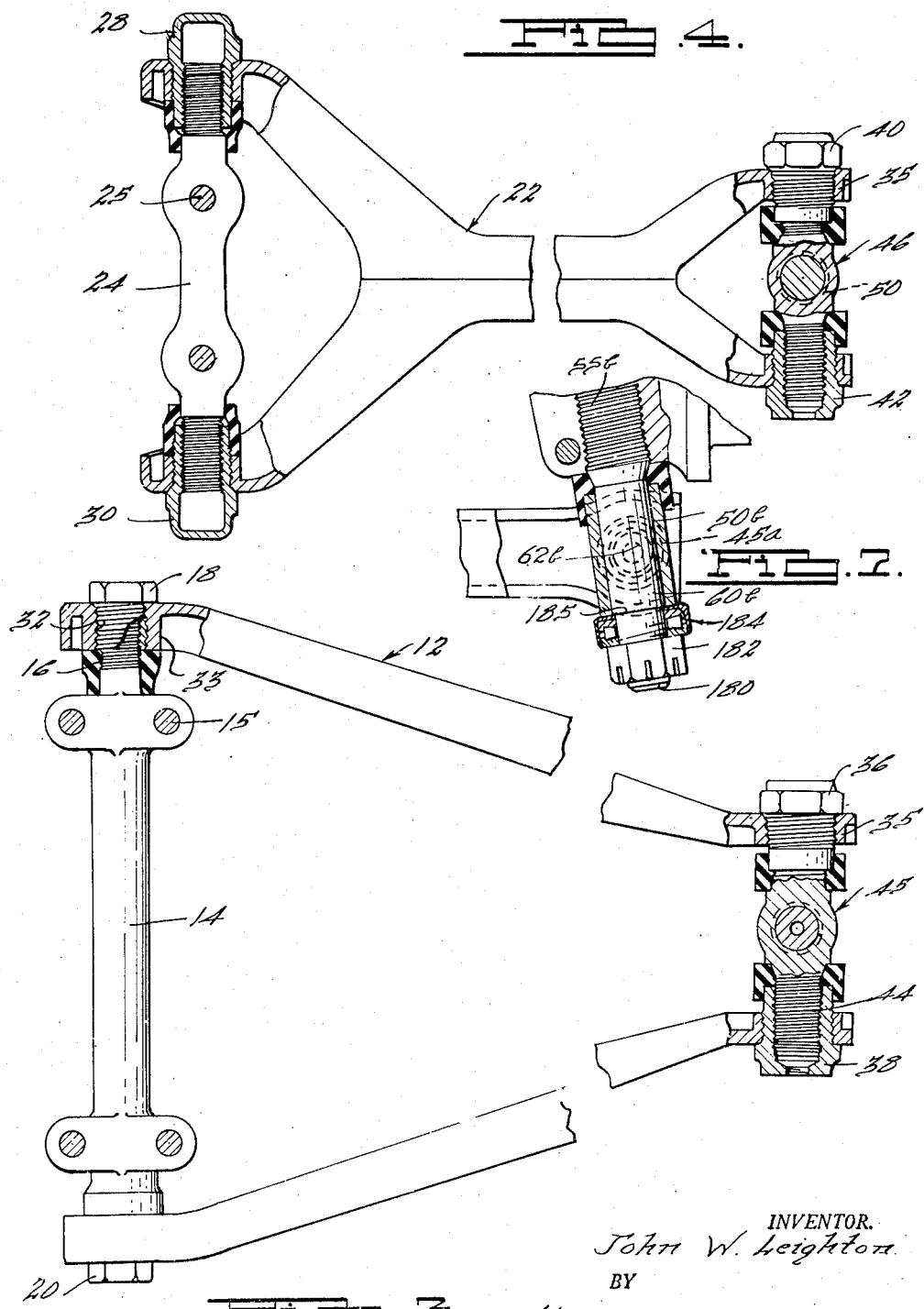

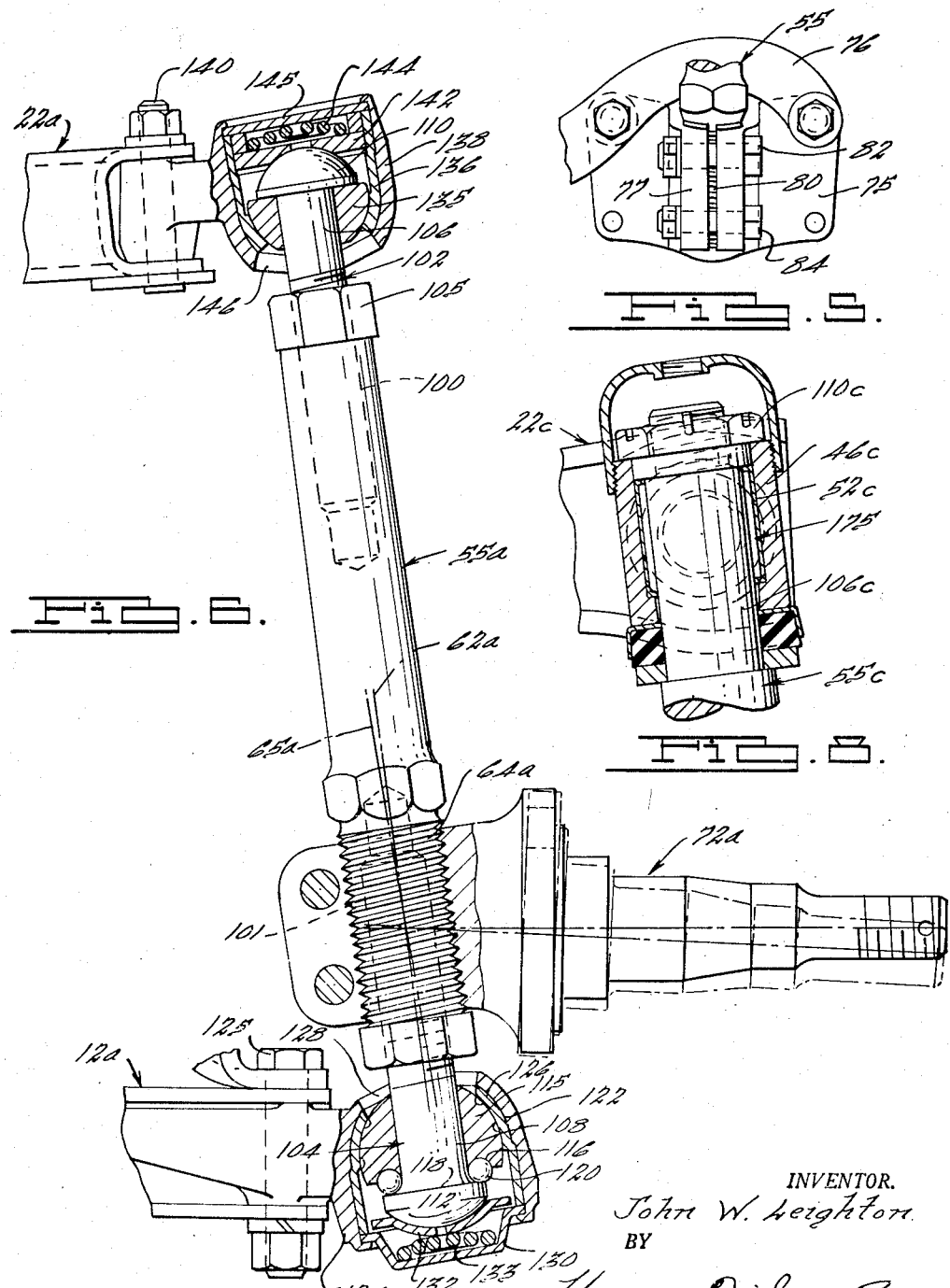

Patented July 20, 1954

2,684,253

UNITED STATES PATENT OFFICE 2,684,253

VEHICLE WHEEL MOUNTING WITH CAMBER ADJUSTMENT

John W. Leighton, Port Huron, Mich.

Application August 24, 1951, Serial No. 243,539

9 Claims. (Cl. 280—96.2)

The present invention relates to vehicle suspensions and is particularly concerned with improvements in the construction and arrangement of the parts utilized to steerably support the front wheels of motor cars equipped with independent wheel suspensions of the so-called "wishbone" type, wherein a pair of vertically spaced, laterally extending control arms are provided, pivoted to the vehicle frame structure for movement in substantially parallel planes.

It has been common practice to connect the control arms of such a suspension together at the outer ends by means of a steering knuckle support which in turn carries a kingpin, the steering knuckle and the wheel spindle and wheel carried thereby being swingable on the kingpin during steering.

It is an object of my present invention to provide an improved construction wherein the outer ends of the control arms are connected by a single kingpin-link element and wherein the wheel spindle is directly connected to such kingpin-link, the steering knuckle and conventional kingpin being eliminated.

Another object is to provide such a construction wherein the kingpin-link, the wheel spindle, and the attaching portions which are employed to connect the kingpin-link and wheel spindle together are of a novel and improved construction which enables quick and simple adjustments of camber angle. Another object is to provide such a construction wherein the adjustment of the camber angle can be made by loosening a clamping device which serves to connect the wheel spindle to the kingpin-link, and then rotating the kingpin-link with relation to the wheel spindle. Another object is to provide such an improved suspension arrangement wherein adjustments of the camber angle in the manner indicated do not introduce any tendency to create binding or an undesired degree of friction in the pivot bearings of the suspension. Still another object is to provide such a construction wherein the portions which must be manipulated in order to adjust the camber angle are conveniently located close to the wheel. Still another object is to provide such a construction which may be considerably lighter in weight without sacrifice of strength, thereby permitting a reduction in the unsprung weight of the vehicle, with a resultant improvement in the riding qualities of the vehicle.

Convenient means for adjusting the camber angle is considered desirable. Practically all current makes of motor cars are equipped with either eccentric pins or eccentric bushings mounted in threaded bearings that are located at the outer ends of the upper control arms. With such arrangements, adjustment of the camber angle may introduce undesirable binding in said bearings. In my improved construction I avoid such binding in a novel manner wherein the wheel spindle, kingpin and steering knuckle support as conventionally employed have been replaced by the aforementioned kingpin-link, which is relatively long and has axially aligned bearing portions at its ends, and has an intermediate cylindrical portion having its axis at an angle to the axis of said axially aligned bearing portions, said intermediate cylindrical portion being securely clamped in the inner end of the wheel spindle.

Still another object is to provide such a construction wherein the steering pivot bearings are spaced farther apart than in conventional steering arrangements, the side pressures and friction on the kingpin bearings being thereby substantially reduced so that easier steering is attained.

Still another object is to provide an improved method of assembling a wheel suspension in such manner that the positioning and angular relationship of the parts may be accurately predetermined, and particularly so that the caster angle can be accurately predetermined and will be alike on all vehicles, within very close limits, without the necessity of any individual adjustment of the caster angle on the vehicles after they are assembled.

Another object is the provision of an improved construction of the indicated character wherein the wheel spindle, kingpin-link, trunnions and threaded bearing bushings may be made by new low cost extruded and upset methods instead of the more expensive forging and machining operations usually used and which will achieve savings in both labor and material.

Other objects will become apparent upon consideration of the present disclosure in its entirety.

In the drawings:

Fig. 3 is a plan view also partly broken away and partly in section, of the lower control arm and pivot bearing elements;

Fig. 4 is a view similar to Fig. 3 of the upper control arm;

Fig. 5 is a fragmentary elevational view taken substantially as indicated by the arrow designated 5 in Fig. 1;

Fig. 6 is a view similar to Fig. 2 showing a somewhat modified construction; and Figs. 7 and 8 are sectional details of two further modifications, Fig. 8 being on a somewhat larger scale.

Figure 1:
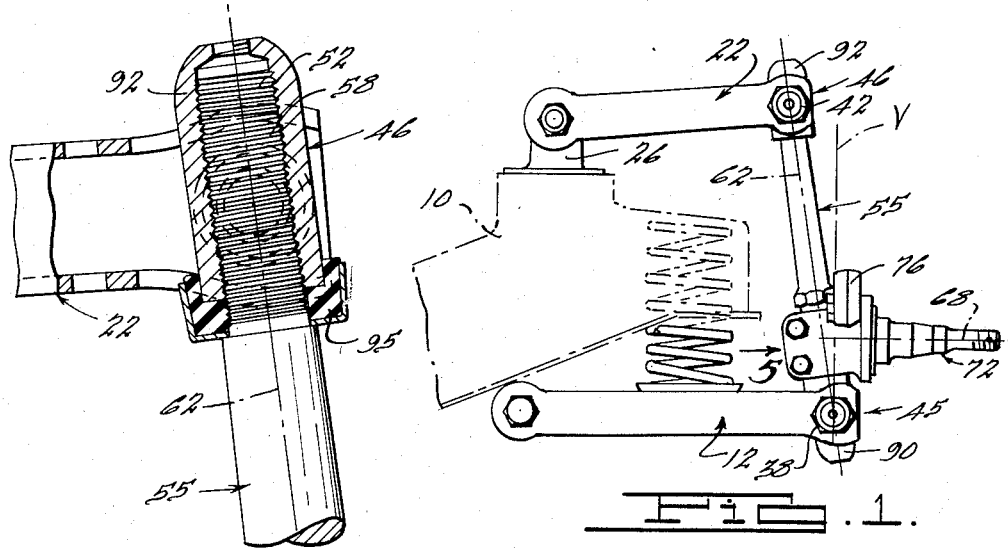
Figure 1 is a partly diagrammatic front elevational view of a suspension assembly for the front wheel of a motor vehicle, illustrating a preferred embodiment of my invention.

Referring now to the drawings, and particularly to Figs. 1 to 5 inclusive, reference character 10 designates a cross frame member of a motor vehicle chassis. It will be recognized that this and other conventional parts which form no part of my present invention may vary widely in construction.

I will first describe a preferred embodiment of my invention as a completed assembly, and will thereafter describe my preferred novel method of assembly thereof.

The lower control arm, generally designated 12, is indicated as of the wishbone type, and is pivotally connected at its inner end to a control bar 14 secured as by bolts 16 to the frame member 10. The control bar 14 is shown as provided at its ends with threaded bearing portions 16 upon which are journaled the suitably internally threaded bearing bushings 18, 20, one such bushing being secured in each of the spaced inner ends of the legs of the wishbone structure.

The upper control arm is generally designated 22 and may be similarly pivotally connected at its bifurcated inner extremities to a control bar 24 secured as by bolt means 25 to bracket 26 attached to an upper portion of the frame member 10. The bearing bushings 28, 30 may correspond to the bearing bushings 18, 20 for the lower control arm. All of the bearing bushings, including those employed at the outer extremities of the control arms and which will presently be described, are provided with relatively blunt external holding threads, as 32, tightly screwed into suitable neck flanges, as 33, formed integrally from the sheet metal control arm wall portions. The bushings are provided with very hard surfaces and the bushings and flanges 33 are so proportioned that as the bushings are screwed into place they form their own threads in such control arm flanges, which are less hard than the bushings. Further details of construction of such control bars and bushings may be derived by referring to my copending application, Serial No. 771,111 filed August 28, 1947 now Patent No. 2,576,885 and/or to my issued Patent No. 2,321,832 granted June 15, 1943.

The upper and lower control arms are also provided with spaced or bifurcated ends, each having coaxial collar flanges, as 35, adapted to accommodate the bearing bushings 36, 38, 40, 42. The lower arm bearing bushings 36, 38 coact with a trunnion member generally designated 45 having coaxial oppositely projecting extremities provided with bearing threads, as 44, and threadedly interfitted with the respective correspondingly internally threaded portions of the bearing bushings 36, 38. A similar trunnion member for the upper control arm outer end is generally designated 46. Each trunnion member is provided with an enlarged central section as 90, 92 having a cylindrical opening in which internal bearing threads, as 50, 52 are formed.

The outer ends of the control arms are connected by a kingpin-link member generally designated 55 and which is provided at its upper and lower extremities with coaxial male bearing thread portions 58, 60, adapted to be threadedly interfitted with the internal bearing threads 50, 52 of the trunnion members 45, 46. The common axis of the bearing thread portions 58, 60 defines the steering axis and is designated 62 in Figs. 1 and 2.

An intermediate portion 64 of the kingpin-link, shown as located somewhat above but relatively close to the bottom threaded section 60, constitutes the portion to which the spindle is attached, and is tilted with respect to the steering axis 62. Such attachment portion 64 is larger than bearing thread portion 60 and its external surface is cylindrical and provided with threads of relatively fine pitch. The axis of the cylindrical section 64 is shown as tilted approximately 1½° with respect to the axis 62, about a center, designated 66, which lies in a position approximately midway of the length of the attachment portion 64. At the center 66, three axes intersect, such axes comprising the steering axis 62 previously mentioned, the tilted axis 65 of the attachment portion 64, and the wheel spindle axis 68. Above the tilted attachment portion 64 the kingpin-link is provided with a hexagonal wrench-receiving portion 70.

The wheel spindle portion 74 may be of conventional form and adapted to support the wheel bearings and wheel (not shown). It is also provided with an integral flange 75 for attaching a brake backing plate (not shown) and a steering arm 76 which is fragmentarily illustrated. The spindle is also provided with an integral inwardly extending attachment portion 77 of relatively heavy blocklike form having an internally threaded opening 78 adapted to threadedly overengage the external threads of the attachment portion 64 of the kingpin-link. The attachment portion 77 is radially slotted, as indicated at 80, to impart radial resiliency to the internally threaded portion thereof, and clamping bolts 82, 84 are provided extending between and adapted to tightly clamp together the clamping block sections on either side of the slot 80. The dimensions of the attachment portion 77 are such that when the bolts 82, 84 are loosened, the kingpin-link can be turned easily in the attachment portion 77 of the spindle, while when the bolts are tightened, the spindle is rigidly secured to the kingpin-link to form in effect a unit therewith.

Figure 2:
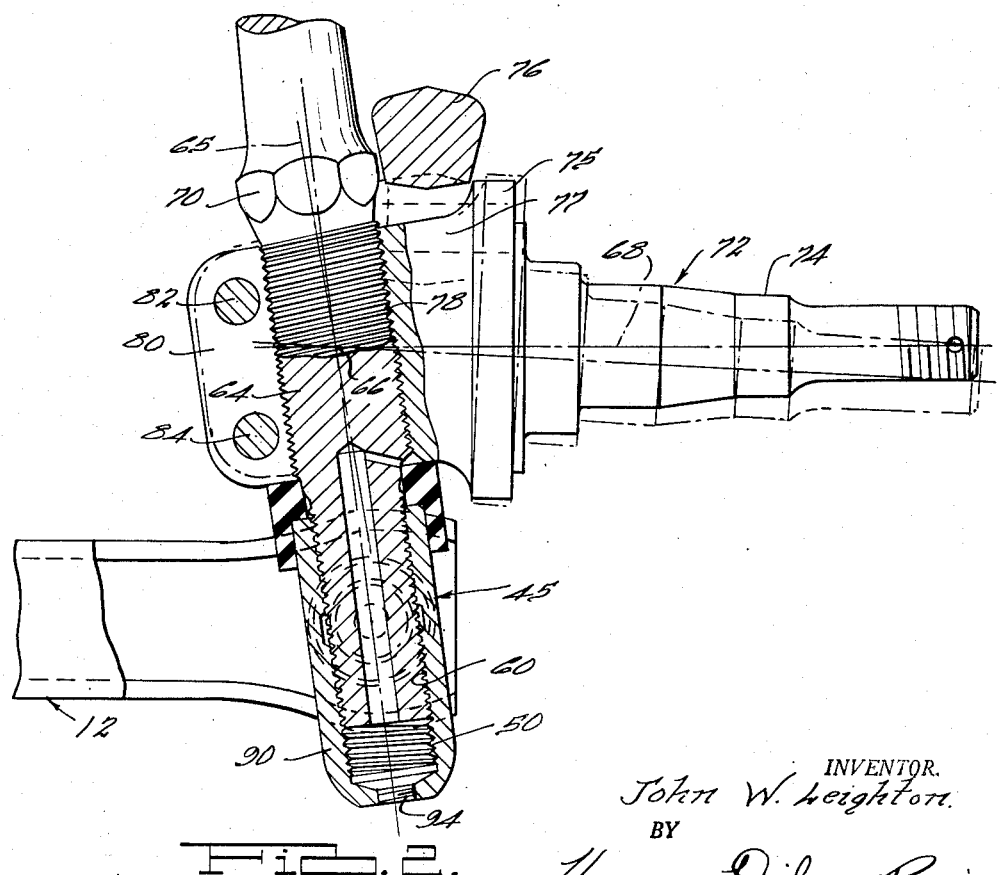
Fig. 2 is a similar view upon a larger scale and partly broken away to illustrate important parts in section.

As shown in Figs. 1 and 2, the steering axis 62 is inclined inwardly toward the longitudinal vertical center plane of the vehicle as it extends upwardly. For comparison, a vertical axis is shown in Fig. 1 and designated "V." The opening 78 in the attachment portion 77 is so inclined with respect to the spindle axis 68 that when the spindle is secured to the attachment portion 64 of the kingpin-link 55 with the link rotated to a mean position of adjustment, the axis 68 will lie at such an angle to the vertical as to impart to the wheel a desired camber angle. With the parts assembled, as shown, but with the bolts 82 and 84 loosened, rotating the kingpin-link 55 in the opening 78 will cause the spindle to move in a conic path. The apex of the cone of such adjusting movement will lie at the point 66. If the axes 62, 65 are tilted 1½° with respect to each other, as in the illustrative construction depicted herein, the maximum range of adjustment of the spindle axis will be 3°, and it will be seen that this affords a range of 3° for adjustment of camber. Although the spindle axis 68 is moved circularly so that the toe-in adjustment is affected by such adjustments of camber, it will be appreciated that the toe-in should be readjusted whenever camber adjustment is made in any event. Means is customarily provided in the steering linkage, as for example in the tie rod, for adjusting toe-in, so that after camber has been adjusted by rotating the kingpin-link 55 in the manner described, toe-in may be checked and adjusted in the usual manner.

The angle between the steering axis 62 and the vertical imparts a wheel-straightening effect. This angle remains essentially unchanged during adjustment of camber in the manner described (except for any small change resulting from the effect of raising or lowering the portion of the vehicle carried by the suspension which is subjected to adjustment). In the construction shown, such an angle is only indicated as existing in a plane transverse to the vehicle, but whenever the wheels are steered away from the position wherein axes 62 and 68 lie in the same vertical plane, the vehicle is somewhat lifted because the axis 68 is then swung in an arcuate path which carries it downwardly toward the ground. The weight of the car thus always tends to return the wheels a predetermined position and this effect is similar to the effect of the caster angle in a conventional suspension. If desired, the axis 62 may also be tilted in a longitudinal plane for further caster effect, as will be appreciated. All of such inclination of the steering axis for wheel straightening effect, regardless of the plane in which such inclination lies, is built in at the initial assembly of the vehicle, and will require no adjustment throughout the vehicle life unless it should be destroyed by an accident which would require extensive realignment or replacement of the parts in any event.

In the construction illustrated, the central sections 90, 92 of the trunnion members 45, 46 are vertically elongated and may be closed at their outer ends and/or provided with lubricant fittings as 94, although such details of construction are matters of choice as will be appreciated. Conventional dust sealing and lubricant retaining means may also be provided as indicated generally at 95.

In assembling the parts of my improved suspension structure, I preferably provide suitable locating jigs for holding the control bars 14 and 24 and the kingpin-link 55 rigidly in predetermined positions with respect to one another. It will be appreciated that the details of construction of the jig means may vary, although a convenient way of aligning the control bars is to fit the bolt holes therein over suitably positioned pins so that the bars are held in positions corresponding to the positions they will occupy when subsequently installed upon a vehicle and the kingpin-link 55 is also clamped or otherwise held in a position corresponding to the position it will occupy when installed, with relation to the control bars. The control arms 12 and 22 are loosely fitted over the threaded extremities of the control bars and over the threaded extremities of the trunnion members 45, 46, but the control arms are not otherwise located or held in position and are accordingly free to adjust themselves as the bearing bushings 18, 20, 28, 30, 36, 38, 40 and 42 are installed. The bearing bushings are started and screwed in enough to position them by hand. Then the two outer bushings and the two inner bushings of each arm may be driven home as by suitable power operated driving tools while the two bars and kingpin-link are rigidly held in the jig in their desired relationship. As the bearing bushings are driven home, they deform the material of the several collar flanges as 35 in the control arms to form the holding threads in the latter and such insertion of the bearing bushings positions the control arms in their desired relationship with respect to the trunnion bearings and control bar bearings. Such bearings of the trunnions and control bars, being of the threaded type, serve as lead screw means for the bearing bushings and when the bushings are tightened, the relationship between such parts is permanently established. The bifurcated ends of the control arms may be held slightly spread apart during such installation of the bearing bushings, in accordance with known practice, so that after removal of the spreading means such bifurcated ends may approach one another slightly to a position in which binding between the threaded bearing parts is eliminated.

The holes in the vehicle frame 10 or other supporting structure for the bolts as 15, 25 are preferably also accurately located by means of jigs or the like so that the suspensions on all vehicles and upon the opposite sides of each vehicle will be accurately located in identical positions. As previously indicated, the parts may be installed in the vehicle in such tipped position that the steering axis 62 tilts toward the front or rear of the vehicle to provide an additional wheel straightening effect. The assembly of each complete suspension with the aid of jig means and the accurate locating of the bolt holes in the frame for attachment of the control bars, as by jigs, insures the maintenance of exact angular relationship between the parts and the pivots in all planes, so that the predetermined angular position of axis 62 will be exactly established in all planes and will be uniform on all vehicles and on both sides of each vehicle. Since this angular position of axis 62 determines the wheel straightening effect, prefixing axis 62 with such accuracy eliminates the need for individual adjustments corresponding to the usual caster adjusting means, and no such individual adjustment on the vehicle is required either initially or during the normal vehicle life.

In Fig. 6 I have shown a modified construction indicating the ready adaptability of my invention to suspensions employing connections of the ball type between the control arms and the steering knuckle support. Parts substantially corresponding to those already described are designated by like reference characters and many of these will not require detailed redescription. The kingpin-link is designated 55a. At its upper and lower ends the kingpin-link 55a is provided with tapped sockets 100, 101 in which upper and lower bearing bolts 102, 104 are fitted, the bolts being indicated as locked in place as by jam nuts 105. The bolts have cylindrical stem portions as 106, 108 which project axially and are provided with head portions 110, 112 of hemispherical form. An intermediate attachment portion 64a of the link 55a is inclined with respect to the steering axis 62a as in the first embodiment. The steering axis is coaxial with the stem portions 104, 106 of the bearing bolts and the spindle 72a may be attached, by means similar to that of the first embodiment, to the attachment portion 64a, the axis of which is designated 65a. Rotatably fitted on the stem portion 108 of the lower bearing bolt is as suitably apertured partly spherical hardened bearing element 115 having a bottom portion provided with a downwardly directed ball race portion 116 arranged in opposition to another race portion designated 118 which defines the shoulder joining the head 112 to the stem 108 of the lower bearing bolt. Antifriction balls 120 are mounted in such races. The spherical member 115 is rockably fitted in a corresponding spherical socket portion 122 formed in a bearing bracket 124 secured as by bolt means 125 to the outer end of the lower control arm 12a. A hardened bearing liner 126 is interposed between ball portion 115 and socket portion 122. An opening 128 in the top of socket portion 122 provides clearance for the stem 108 of the bearing bolt and the lower end of the socket bearing assembly is closed by a cap 130. A desired degree of friction and take-up of clearance are provided by a bearing plate 132 arranged within the head portion 124 of the socket member, the plate being urged against the spherical head 112 by the helico-spiral spring 133. A generally similar bearing element is provided for securing the upper end of the kingpin-link to the outer end of the upper control arm 22a, although since there is relatively little vertical loading of such bearing parts, no antifriction balls need be provided within such bearing structure. A partly spherical bearing ring 135 is provided upon the stem 106 of the upper bearing bolt and is similarly rockable in a bearing liner 136 carried in a bearing socket bracket 138 attached as by bolt means 140 to the outer end of the control arm. A bearing clearance take-up plate 142 is also provided urged against the spherical head 110 of the bolt by a spring 144 retained by a closure plate 145. An enlarged opening 146 provides clearance between the bracket and the stem of the bearing bolt.

It will be seen that in this embodiment, during steering movements the bearing bolts can turn with the link 55a upon the steering axis 62a, while during springing movements the sockets may rock freely upon the spherical bearing surfaces, the spherical surface of the lower bearing portion 115 and of the lower bolt head 112 being preferably substantially concentric with respect to a common center, and the same preferably also being true of the spherical block 135 and the spherical head portion 110. With the provision of such ball joints it will be seen that there is great latitude in the arrangement of the parts, and no special alignment in the initial positioning is required in order to prevent binding of the parts during springing movements or steering. Means for adjusting caster can accordingly be provided, as for example at the inner end of one of the control arms, as for example in the manner shown in my application, Serial No. 773,436, filed September 4, 1947, or in any other suitable manner, if desired, without affecting either the steering or the freedom of action of the suspension.

In Fig. 7, I have illustrated a modification wherein a smooth bearing portion 50b is provided in the lower trunnion element 45b, the kingpin-link 55b being provided at its lower extremity with a coacting smooth bearing portion 60b pivoted therein for rotation about the steering axis 62b, and also being provided with a downwardly projecting threaded lower extremity 180 upon which a retaining nut 182 may be fitted, an antifriction thrust bearing, shown as of the tapered roller type, and which is generally designated 184, being interposed between the nut 182 and the smooth bearing portion 45b of the trunnion element. The bearing assembly is located between the nut 182 and a shoulder 186 formed upon the kingpin-link. It will be seen that the antifriction bearing assembly carries the vertical loading resulting from the weight of the vehicle and accordingly reduces friction and assists in ease of steering. Although the bearing portions 50b and 60b are shown as of the plane or smooth type, it will be appreciated that either a bronze bearing liner or antifriction bearings could also be incorporated to take the lateral thrust, as is shown, for example, in Fig. 8 in connection with the upper steering bearing of the further modification disclosed in that view.

In the modification shown in Fig. 8, a needle bearing structure is substituted at the upper end of the kingpin-link for the bearing means shown in the previously described embodiments. The kingpin-link is generally designated 55c and is provided at its upper end with a reduced stem portion 106c projecting into a socket 52c in a trunnion member 46c pivotally connected to the outer end of control arm 22c. At its upper end the kingpin-link is threaded to receive a stepped nut 110c which forms a closure for the upper end of socket 52c and also forms a retaining shoulder for the needle bearing assembly 175. It will be understood that the bearing structure at the lower end of the kingpin-link 55c may correspond to one of those previously described or alternatively may incorporate a needle bearing, as shown at the upper end, and/or a thrust bearing, as described in connection with the embodiment of Fig. 7. My studies have led me to conclude that the lateral forces imposed upon the upper pivots of such a kingpin-link are greater than has been realized. The use of such an antifriction bearing at the upper end as shown in Fig. 8 accordingly results in a considerable improvement in steering ease.

It will be recognized that any one of the constructions shown at the upper end of the kingpin-link might be used in combination with any one of the constructions shown at the lower end, in the several views, and while it will be apparent that the preferred embodiments of the invention herein described are well calculated to fulfill the objects and advantages first above stated, it will be appreciated that the invention is susceptible to further variation, modification and change without departing from the fair meaning and proper scope of the appended claims.

I claim:

1. Supporting means for a steerable wheel comprising a kingpin member means for supporting said member for rotation about a longitudinal axis, a spindle, and releasable coacting attachment portions carried by said kingpin member and spindle for rigidly securing one to the other in a plurality of different positions of relative angularity.

2. Supporting means for a steerable wheel comprising a kingpin member, a spindle, and releasable coacting attachment portions carried by said kingpin member and spindle for securing one to the other in a plurality of different angular positions, said kingpin member being provided with coaxial steering bearing portions and said attachment portions include a part rotatable about an axis arranged at an angle to said steering axis and which is also at an angle to the axis of the spindle, and means for rigidly securing the spindle and the kingpin member together to prevent such rotation.

3. In a wheel suspension system including a plurality of oscillatable suspension arms, a link structure, means interconnecting said arms and link structure including steering bearing portions rotatably supporting the link structure for turning movement about a steering axis, a spindle releasably securable to the link structure in any of a plurality of different angular relationships with respect to said steering axis to change the angular relationship between the spindle and the steering axis.

4. Means for supporting a steerable vehicle wheel comprising, a kingpin member having substantially coaxial vertically spaced steering bearing portions defining a steering axis and having an attachment portion arranged upon a tilted axis disposed at a relatively small angle to said steering axis, a spindle having an attachment portion securable to said previously mentioned attachment portion and rotatable about the latter concentrically with said tilted axis, and means for holding said attachment portions against such rotation.

5. In a wheel suspension system including a pair of oscillatable suspension arms vertically spaced from one another, a kingpin-link, and means connecting said kingpin-link to said arms for bodily springing movement with the arms and for rotation about a steering axis substantially coinciding with a line projected between the points of connection of the link and arms, including a trunnion member pivoted to the upper arm of said pair, and an antifriction bearing connecting the link to the trunnion member for rotation about said steering axis.

6. Means for supporting a steerable vehicle wheel comprising, a kingpin member having substantially coaxial vertically spaced steering bearing portions defining a steering axis and having an attachment portion located between said steering bearing portions and arranged upon a tilted axis disposed at a relatively small angle to said steering axis, a spindle having an attachment clamping portion securable to said previously mentioned attachment portion and rotatable about the latter concentrically with said tilted axis, and means for holding said attachment portion and attachment clamping portion against relative rotation.

7. Means as defined in claim 6 wherein said attachment portion is tilted about a transverse axis which is located intermediate the length of such attachment portion.

8. Means as defined in claim 6 wherein said attachment portion is tilted about a transverse axis which is located intermediate the length of such attachment portion and which substantially intersects the axis of said spindle.

9. Means as defined in claim 6 wherein said attachment portion is tilted about a transverse axis which is located intermediate the length of such attachment portion and which substantially intersects the steering axis and the axis of said spindle.

References Cited in the file of this patent

UNITED STATES PATENTS

| Number | Name | Date |
|---|---|---|
| 1,705,630 | Woolson | Mar. 19, 1929 |
| 2,122,476 | Leighton | July 5, 1938 |
| 2,123,087 | Leighton | July 5, 1938 |
| 2,167,984 | Leighton | Aug. 1, 1939 |